(12) United States Patent
Jasper et al.

(10) Patent No.: US 9,428,652 B2
(45) Date of Patent: Aug. 30, 2016

(54) COLOR CHANGING AQUEOUS COATINGS

(71) Applicant: The Sherwin-Williams Company, Cleveland, OH (US)

(72) Inventors: John T. Jasper, Brunswick, OH (US); Chi Lee, Brunswick, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 496 days.

(21) Appl. No.: 13/840,215

(22) Filed: Mar. 15, 2013

(65) Prior Publication Data

US 2014/0264200 A1 Sep. 18, 2014

Related U.S. Application Data

(62) Division of application No. 11/756,879, filed on Jun. 1, 2007.

(51) Int. Cl.
| | |
|---|---|
| *C09D 7/12* | (2006.01) |
| *C09D 5/00* | (2006.01) |
| *C08K 5/13* | (2006.01) |

(52) U.S. Cl.
CPC ............... *C09D 7/1233* (2013.01); *C09D 5/00* (2013.01); *C08K 5/13* (2013.01)

(58) Field of Classification Search
None
See application file for complete search history.

(56) References Cited

U.S. PATENT DOCUMENTS

| | | | | |
|---|---|---|---|---|
| 4,070,510 | A | * | 1/1978 | Kahn .......................... 427/385.5 |
| 4,071,449 | A | * | 1/1978 | Inoue et al. .................. 210/714 |
| 5,454,959 | A | * | 10/1995 | Stevens .......................... 210/792 |
| 2005/0143505 | A1 | * | 6/2005 | Rosekelly et al. ............ 524/236 |

FOREIGN PATENT DOCUMENTS

| | | | |
|---|---|---|---|
| EP | 488980 A1 | * | 6/1992 |
| EP | 705854 A1 | * | 4/1996 |

* cited by examiner

*Primary Examiner* — Nicole M Buie-Hatcher
(74) *Attorney, Agent, or Firm* — Peter T. Nguyen; James C. Scott; Daniel A. Sherwin

(57) ABSTRACT

This invention relates to color changing aqueous coatings which are stable at a pH greater than about 10.5.

4 Claims, No Drawings

COLOR CHANGING AQUEOUS COATINGS

This application is a divisional of U.S. non-provisional patent application Ser. No. 11/756,879 filed on Jun. 1, 2007, and which in turn claims the benefit of U.S. provisional patent application No. 60/810,620 filed on Jun. 2, 2006, the entirety of which is hereby incorporated by reference.

This invention relates to aqueous coating compositions that are stable at a pH of 10.5 or higher and which incorporate a pH sensitive color-changing additive.

The incorporation into aqueous coatings of pH sensitive color indicators which impart color at a certain pH and then either become colorless or attain a different color as the coating dries and the pH changes, can provide increased wet hiding and can provide a useful visual guide to identify the areas where fresh paint has been applied. This characteristic is especially useful in areas of poor lighting such as interior ceilings or when applying a fresh coat of paint over a similarly colored previously painted surface, or when applying a protective clear coat over a substrate which might or might not have been previously painted.

For certain applications and uses, it would be desirable to have an aqueous color changing coating composition that is storage stable for an extended period, for example for twelve months or more, at a relatively high pH, such as above about 10.5, but which would still undergo a rapid color change when applied to a substrate and allowed to dry. Color changing paints that are stable at this high pH and which change color at a relatively high pH have several advantages. For example, dried coatings having a color change indicator that maintains a colored form at a relatively lower pH, such as, for example 9.5 or less, are more sensitive to potential color changes when contacted by a relatively mild base, such as some ammonia based household cleansers. Although this color change may be temporary, it is unsightly and undesirable.

Additionally, in the manufacture of coatings, it is frequently desirable to work off minor amounts of previously manufactured coatings by blending them into new batches of the same or similar coatings subsequently being manufactured. This allows for the use of materials that otherwise might have to be discarded. Many typical waterborne coatings, which frequently are not intended to incorporate color-changing additives, would commonly have a pH at manufacture of about 7.5 to about 9.5. Color changing paints that would impart color at this pH cannot be incorporated into these coatings without the side effect of creating a temporary color which would be undesirable in those products.

It is also common in the manufacture of aqueous coatings to rinse the manufacturing equipment such as tanks, mixing equipment and transfer lines with water to clean the equipment after the manufacturing cycle is completed and the coating has been removed. This rinse water will contain minor amounts of the previously manufactured paint and might contain up to 10% or more by weight of the previously manufactured paint. It can be useful to reuse this rinse water by incorporating minor amounts of this rinse water into subsequent batches of aqueous coatings. This process can minimize waste water and can reduce manufacturing costs. Generally, 1 to about 5% of the water utilized in the subsequent manufacture can be rinse water from a previous manufacture. Again, if a subsequent manufacture involves an aqueous coating having a pH of less than about 9.5 or even less than about 9.0, as would be common, the rinse water from a previous color changing paint manufacture would not be useful if the color changing paint incorporated a color changing additive which would be colored at the pH of the subsequent batch.

Although there are potential advantages to the use of these color changing coating formulas having a pH of at least about 9.5, or at least about 10.2, or for many applications, about 10.5 or higher, there are also potential difficulties arising from the higher pH.

For example, it can be difficult to maintain color stability of the wet paint for a reasonable shelf life in the container since the high pH can facilitate chemical changes which may effect the pH upon storage. Applicants have discovered that these difficulties can be overcome by proper selection of materials incorporated into the paints. Applicants have determined that acrylic and styrenated acrylic resins are more stable at these higher pH ranges than vinyl acrylics and that ester solvents, including common ester coalescing agents such as Texanol® (2,2,4-trimethyl-1,3-pentanediol mono(2-methylpropanoate), can hydrolyze, or undergo other chemical changes, under such conditions and thereby change the pH of the wet paint. Therefore, by the proper selection of resin, base, color changing additives and solvents, high performance storage stable color changing aqueous coatings having a greater than about 10.5 can be produced.

In general, this invention relates to an aqueous coating composition comprising:
(i) at least one latex resin selected from the group consisting of acrylic resins and styrenated acrylic resins;
(ii) at least one volatile base in an amount effective to provide a pH of at least about 10.5;
(iii) an effective color changing amount of at least one color change additive selected from the group consisting of o-cresolphthalein, p-naphtholbenzein and thymolphthalein;
(iv) at least one ether solvent;
and wherein the coating composition is substantially free of ester functional solvents; and wherein the coating has a viscosity less than about 120 Krebs units (KU), and preferably less than 110, at 55% NVM, Krebs units are a measure of the consistency of a paint and are typically determined by a Krebs-Stormer Viscometer at room temperature.

Another aspect of this invention involves a process of coating substrates utilizing the coatings of this invention to provide a wet coating having a first color and allowing it to dry to provide a visually different second color.

aspect of this invention relates to a process of manufacturing aqueous coatings wherein the process comprises:
(i) manufacturing in paint manufacturing equipment a first aqueous coating by admixing:
(1) at least one latex resin selected from the group consisting of acrylic resins and styrenated acrylic resins;
(2) at least one volatile base in an amount effective to provide a pH of at least about 10.5;
(3) an effective color changing amount of at least one color change additive having a colored conjugate base form and a colorless conjugate acid form and selected from the group consisting of o-cresolphthalein, p-naphtholbenzein and thymolphthalein;
wherein said first aqueous coating is substantially free of ester solvents; and
(ii) removing most but not all of said first aqueous coating from said paint manufacturing equipment;

(iii) rinsing said paint manufacturing equipment with a solution comprising water to create a first rinse comprising water and at least some first aqueous coating;

(iv) providing a second aqueous coating composition comprising at least one water soluble or water reducible resin and having a pH less than about 9.0; and (v) admixing at least some of said first rinse with said second aqueous coating composition in quantities such that the color change additive is converted from its colored conjugate base form to its colorless conjugate acid form.

Since the final pH of this mixture will typically be less than about 9.5, the water soluble or water reducible resins of the second aqueous coating could be any resin which could be stably dispensed in an aqueous solution and could include latexes such as acrylic latexes, styrenated acrylic latexes, vinyl acrylic latexes, etc.

Another aspect of this invention involves a process of manufacturing aqueous coatings which process comprises:

(i) providing a first aqueous coating comprising:
  (1) at least one latex resin selected from the group consisting of acrylic resins and styrenated acrylic resins;
  (2) at least one volatile base in an amount effective to provide a pH of at least about 10.5;
  (3) an effective color changing amount of at least one color change additive having a colored conjugate base form and a colorless conjugate acid form and selected from the group consisting of o-cresolphthalein, p-naphtholbenzein and thymolphthalein;

(ii) providing a second aqueous coating composition comprising at least one water soluble or water reducible resin and having a pH less than about 9.0; and (iii) admixing said first aqueous coating and said second aqueous coating in such quantities that the color change additive is converted from its colored conjugate base form to its colorless conjugate acid form.

1. Color Changing Additives

Color changing additives, such as o-cresolphthalein, p-naphtholbenzein and thymolphthalein, which are colored in their conjugate base form above a pH of about 9.5 and which are colorless in their conjugate acid form at a pH of about 9.0 or below are especially useful in the coatings of this invention. In certain embodiments of this invention, o-cresolphthalein is especially useful.

The color changing additives can be conveniently added during the manufacture of the coating, and typically will be present at a level of at least about 0.001% by weight, and typically from about 0.001% up to about 5% by weight of the aqueous coating. For some applications, it is convenient to incorporate the additive at a level from about 0.01% to about 0.1% by weight of the aqueous coating.

2. Acrylic Latexes

The relatively high pH of the coatings of this invention can cause a chemical change in the structure of some latexes, such as vinyl acrylic latexes upon relatively long periods of storage. These changes can affect the pH and eventually reduce the in-can color of the aqueous coating. Therefore the principal latex resin of the coatings of this invention should be selected from resins which are sufficiently stable at a pH of 10.5 to provide adequate shelf life, such as acrylic latexes and styrenated acrylic latexes.

The acrylic and styrenated acrylic latex polymers used as resins in accordance with the present invention include those polymers polymerized from one or more suitable monomers. Typically, the binders are polymerized from one or more copolymerizable monoethylenically unsaturated monomers such as, for example, styrene monomers and/or acrylic monomers.

The acrylic monomers suitable for use in accordance with the present invention comprise any compounds having acrylic functionality. Preferred acrylic monomers are selected from the group consisting of alkyl acrylates, alkyl methacrylates, acrylate acids and methacrylate acids as well as aromatic derivatives of acrylic and methacrylic acid, acrylamides and acrylonitrile. Typically, the alkyl acrylate and methacrylic monomers (also referred to herein as "alkyl esters of acrylic or methacrylic acid") will have an alkyl ester portion containing from 1 to about 18, preferably about 1 to 8, carbon atoms per molecule.

Suitable acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, isobornyl acrylate and methacrylate, neopentyl acrylate and methacrylate, and 1-adamantyl methacrylate.

Suitable styrene based monomers incorporate the styrene structure and include styrene, methyl styrene, and similar lower alkyl styrenes, chlorostyrene, vinyl toluene, vinyl naphthalene and divinyl benzene.

Vinyl acrylic polymers, such as those containing more than about 5% vinyl ester monomers, such as vinyl acetate, vinyl propionate, are generally not preferred in the practice of this invention.

In addition to the specific monomers described above, those skilled in the art will recognize that other monomers such as, for example, acrylic monomers which impart wet adhesion, such as monomers having tertiary amine, ethylene ureido, or N-heterocyclic groups, can be used in place of, or in addition to, the specifically described monomers. Representative wet adhesion promoting monomers include methacrylamidoethyl ethylene urea, dimethylaminoethyl methacrylate and 2-ethyleneuriedo-ethyl methacrylate. The amount of such other monomers is dependent on the particular monomers and their intended function, which amount can be determined by those skilled in the art. In one embodiment of this invention, a wet adhesion promoting monomer, if desired, could be present at levels ranging up to about 5% of the total monomer mix by weight.

For many applications, typically, the particle size of the binder resins would range from about 0.1 to 1.0 microns. The Tg of some useful representative binder resins, of the present invention would typically be from about −60 to 100° C. Binder resins having a Tg less than about 20° C. typically require less volatile organic compounds (solvents and coalescents) to form a smooth film compared to higher Tg polymers. In one useful embodiment the Tg would be less than about 10° C. In another useful embodiment the Tg is less than about 1° C. As used herein, the term "Tg" means polymer glass transition temperature.

Preparation of latex compositions is well known in the paint and coatings art. Any of the well known polymerization techniques used to formulate latex polymers, such as free-radical emulsion polymerization can be used in the present invention. Such procedures include, for example, single feed, core-shell, and inverted core-shell procedures which produce homogeneous or structured particles.

3. Volatile Base

Any volatile base which can impart a pH of at least 10.5 can be utilized in the practice of this invention. Blends of bases could be utilized if desired. The base should be present in an amount to provide the desired pH and induce the color change in the color change additive. The volatile base will evaporate as the paint dries. The base should be volatile enough to evaporate at a rate at room temperature that will allow the pH to decrease to an amount sufficient to cause the color change additive to turn colorless. Amines are useful as volatile bases in this invention and preferably amines having a boiling point above about 90° F. Representative amines include 2-amino-2-methyl-1 propanol and dimethylethanol amine. For some applications 2-amino-2-methyl-1 propanol is preferred.

4. Solvents

Organic solvents may be added to the coatings of this invention in order to facilitate the stability and miscibility of the ingredients of the coating, or to prevent freezing, or to adjust drying time. In latex paints, certain solvents function as cosolvents or coalescing agents which aid in film formation by temporarily softening the resin and permitting contact and fusion of adjacent latex particles as the water evaporates and the film dries. Common cosolvents having coalescent properties include esters such as Texanol® (2,2,4-trimethyl-1,3-pentanedial monoisobutyrate from Eastern Chemical). At the relatively high pH of the coatings of this invention, however, ester cosolvents can chemically degrade through hydrolysis or other mechanisms to adversely effect the pH. As such, it is preferred that the coatings of this invention be substantially free of ester cosolvents. By "substantially free" is meant that the amount of ester cosolvent that can be incorporated, generally due to its presence in other additives or raw materials would be less than 1% by weight of the weight of the entire coating. For many applications it is useful to avoid the addition of any ester solvents.

Alcohol solvents such as mono- or polyhydric alcohols, alkylene glycols, etc. and ether solvents such as ether alcohols, diallyl ethers, glycol ethers, ethylene glycol ethyl ethers, propylene glycol propyl ethers, etc., are useful in this invention provided they are free of ester linkages. Ether alcohols such as ethylene glycol monomethyl ether and 2-(2-butoxyethoxy)ethanol are useful in many applications. For many useful latex coatings, water will be present at a level of at least about 30% by weight of the coating, and frequently the coatings will include about 30% to 60% water by weight of the final coating composition.

The coating composition of the present invention is manufactured using techniques known to those skilled in the art of manufacturing paint. The coatings of this invention may also include conventional hiding pigments and flattening agents or extender pigments as well as various additives. Examples of suitable inorganic flatting agents include silicates, such as clay, talc, and various forms of silica, such as amorphous, aerogel, diatomaceous, hydrogel and fumed silicas, barytes, calcium carbonate, and calcium sulfate. Conventional hiding pigments include titanium dioxide, zinc oxide, and other inorganic or organic pigments such as carbon black, ferrite yellow, red iron oxide and phthalocyanine green. The coatings of this invention also may incorporate one or more polymeric opacifying agents. The polymeric opacifiers are generally small particle size, non-film forming, polymerized beads which are insoluble in the coating in which they are dispersed. For many applications the coatings of this invention will include a hiding pigment such as titanium dioxide. For many applications, the coatings would have a pigment volume concentration (PVC) of at least about 25%, and frequently would range between about 25 to about 65%.

Typically additives which may be used in the practice of this invention include dispersants, preservatives, anti foaming agents, thickeners, etc. It is only necessary that the additives be stable in the presence of a pH above about 10.5 for a reasonable shelf life, such as twelve months or more. The coatings of this invention can be applied to any substrate such as wood, wallboard, metal, concrete, etc. by any application method including spraying, brushing, rolling, etc. In one embodiment, the coatings are especially useful as interior or exterior paints, especially ceiling paints.

The present invention will be better understood by reference to the following examples, which are provided for purposes of illustration only and are not to be construed as limiting the scope of the present invention. Unless otherwise specified, "parts" are parts by weight, and percentages are percent by weight.

EXAMPLE 1

A color changing aqueous coating having a pH of approximately 10.5 was prepared by admixing:

| Raw Material | Parts by Weight |
| --- | --- |
| acrylic latex[1] | 344.0 |
| defoamer[2] | 4.0 |
| water | 1000.0 |
| 2-amino-2-methyl-1-propanol 95 | 40.0 |
| o-cresolphthalein | 2.0 |
| attapulgite clay[3] | 24.0 |
| tetra potassium pyrophosphate-TKPP | 14.0 |
| defoamer[2] | 4.00 |
| benzisothiazolone | 2.0 |
| 30 micron crystalline silica | 340.0 |
| calcium carbonate | 1478.0 |
| calcined diatomaceous silica | 280.0 |
| water | 33.0 |
| 2-butoxyethoxyethanol | 40.0 |
| Defoamer[2] | 8.0 |
| 2-amino-2-methyl-1-propanol 95 | 28.0 |
| water | 690.1 |
| non-ionic rheology modifier[4] | 22.0 |
| hydrophobically modified hydroxyethylcellulose[5] | 10.0 |
| water | 121.3 |
| Titanium dioxide slurry[6] | 332.0 |

[1]Rhoplex AC-2829 acrylic resin from Rohm and Haas at 52.5% NVM
[2]proprietary defoamer
[3]Min-U-Gel ® 400 from Active Minerals International L.L.C.
[4]Acrysol ® RM-825 from Rohm and Haas
[5]Natrosol ® Plus 330 from Hercules
[6]TiPure ® R941 from DuPont (64% NVM)

The coating while wet exhibits a purple color upon application to a substrate, however, upon evaporation of the amine while air-drying, the coating turns to a white color with no indication of the original purple color.

After manufacture of this coating in suitable manufacturing equipment, the coating can be removed and the equipment rinsed with water to clean the equipment. The rinse water can be retained and utilized as a portion of the water added to subsequent aqueous paint hatches, even those with a more typical pH of less than 9.5, or especially 9.0 or less, without imparting a purple color.

Additionally, this color changing coating can be admixed with other aqueous coatings, in particular those which do not contain any color changing additives, to work off any remaining quantities of the color changing coating, or to alter the performance properties of the other aqueous coatings, such as those having a more typical pH of 9.5 or less, or especially 9.0 or less, without imparting a purple color. It is only necessary that the relative amounts of the coatings or rinse water, which are admixed be such that the final pH of the admixture is low enough so that the color change additive is in its colorless conjugate acid form.

While the invention has been shown and described with respect to particular embodiments thereof, those embodiments are for the purpose of illustration rather than limitation and other variations and modifications of the specific embodiments herein described will be apparent to those skilled in the art, all within the intended spirit and scope of the invention. Accordingly, the invention is not to be limited in scope and effect to the specific embodiments described herein, nor in any other way that is inconsistent with the extent to which the progress in the art has been advanced by the invention.

The entire disclosures of all applications, patents, and publications cited herein are hereby incorporated by reference.

What is claimed is:

1. A process of manufacturing paint which process comprises:
   (i) manufacturing in paint manufacturing equipment a first aqueous coating paint in its colored conjugate base form by admixing
      (1) at least one water soluble or water reducible resin;
      (2) at least one volatile base in an amount effective to provide a pH of at least about 10.5;
      (3) an effective color changing amount of at least one color change additive having a colored conjugate base form and a colorless conjugate acid form and selected from the group consisting of o-cresolphthalein, p-naphtholbenzein and thymolphthalein;
   (ii) removing most, but not all, of said first aqueous coating from said paint manufacturing equipment;
   (iii) rinsing said paint manufacturing equipment with a solution comprising water to create a first rinse comprising water and at least some first aqueous coating;
   (iv) providing a second aqueous coating composition having a pH less than about 9.5; and
   (v) admixing at least some of said first rinse with said second aqueous coating composition in quantities such that the color change additive is converted from its colored conjugate base form to its colorless conjugate acid form.

2. The process of claim 1 wherein the second aqueous coating composition has a pH less than about 9.0.

3. The process of claim 1 wherein the first aqueous coating is substantially free of ester solvents.

4. The process of claim 1 wherein the first aqueous coating is substantially free of ester solvents.

* * * * *